US012641517B2

(12) United States Patent 
Supanekar

(10) Patent No.: US 12,641,517 B2 
(45) Date of Patent: May 26, 2026

(54) PRIORITIZED CONNECTIVITY SERVICE BASED ON GEOGRAPHY USING HNG

(71) Applicant: Parallel Wireless, Inc., Nashua, NH (US)

(72) Inventor: Ketan Supanekar, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 18/582,501

(22) Filed: Feb. 20, 2024

(65) Prior Publication Data

US 2024/0196303 A1     Jun. 13, 2024

Related U.S. Application Data

(63) Continuation of application No. 17/015,063, filed on Sep. 8, 2020, now Pat. No. 11,910,294.

(60) Provisional application No. 62/897,256, filed on Sep. 6, 2019.

(51) Int. Cl. 
H04W 40/20 (2009.01) 
H04W 40/12 (2009.01)

(52) U.S. Cl. 
CPC ........... H04W 40/20 (2013.01); H04W 40/12 (2013.01)

(58) Field of Classification Search 
CPC .......... G06F 2221/2111; H04W 4/029; H04W 40/12; H04W 4/60; H04W 40/20; H04W 4/02; H04W 4/21; H04W 12/06 
See application file for complete search history.

(56) References Cited

U.S. PATENT DOCUMENTS

| 2020/0007691 | A1 * | 1/2020 | Wong | ................ | H04M 15/8016 |
| 2020/0170022 | A1 * | 5/2020 | Jones | ................ | H04W 72/0446 |

* cited by examiner

*Primary Examiner* — Matthew D. Anderson 
*Assistant Examiner* — Dung L Lam 
(74) *Attorney, Agent, or Firm* — Michael Y. Saji; Ashish Patel

(57) ABSTRACT

A method, computer-readable medium and system are presented for providing prioritized connectivity service based on geography using a HetNet Gateway (HNG). In one embodiment, the method includes specifying a location and time where an event will take place; specifying a User Equipment (UE) prioritization to be used for the event; generating a prioritization profile for the event; providing prioritization for the event based on the prioritization profile; and monitoring prioritization during the event and taking remedial actions when the prioritization performance is not met.

20 Claims, 10 Drawing Sheets

400

PRIORITIZED CONNECTIVITY SERVICE BASED ON GEOGRAPHY USING HNG

CROSS-REFERENCE TO RELATED APPLICATIONS

This application is a continuation of U.S. application Ser. No. 17/015,063, filed Sep. 8, 2020, which claims priority under 35 U.S.C. § 119(e) to U.S. Provisional Pat. App. No. 62/897,256, filed Sep. 6, 2019, titled "Prioritized Connectivity Service Based on Geography Using HNG", each of which is hereby incorporated by reference in its entirety for all purposes. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

In a virtualized Radio Access Network (RAN) environment, there is a cloud computing component which virtualizes the radio network controllers under it by aggregating and proxying their core network signaling. It also proxies data streams coming from these multi rat nodes. These virtualized nodes run as part of cloud RAN virtualization platform which spawns and manages these virtual nodes. There is also a Self Organizing Network (SON) component which runs as part of cloud virtualization platform and provides self configuration, self optimization and self-healing functionality to Multi-Rat devices in access network.

A HetNet Gateway (HNG) can also be provisioned with virtual System Architecture Evolution GateWay (vSAEGW) service which is a combination of S-Gateway (SGW) and PDN-Gateway (PGW) nodes. vSAEGW service provide Evolved Packet Core (EPC) Control and data plane terminations capabilities to HNG.

Charging Gateway Function (CGF) and Policy Control and Charging (PCC) nodes are not part of the Hetnet gateway and vSAEGW service communicates with these nodes using standardized interface (Gx, Gy, Gz).

SUMMARY

The presently disclosed prioritized connectivity service based on geography using HNG is used to create workflow wherein operator can use NMS based GUI to specify area wherein prioritized service is needed for specified duration of time and the HNG dynamically provides prioritized service to such UE's in that area.

In one embodiment a method includes specifying a location and time where an event will take place; specifying a User Equipment (UE) prioritization to be used for the event; generating a prioritization profile for the event; providing prioritization for the event based on the prioritization profile; and monitoring prioritization during the event and taking remedial actions when the prioritization performance is not met.

In one embodiment a computer readable medium includes instructions for core prioritized connectivity service based on geography using a HetNet Gateway (HNG) which, when executed, causes a system node to perform steps comprising specifying, by a user, a location and time where an event will take place; specifying, by a user, a User Equipment (UE) prioritization to be used for the event; generating, by a system including the HNG, a prioritization profile for the event; providing, by the system including the HNG, prioritization for the event based on the prioritization profile; and monitoring, by the system including the HNG, prioritization during the event and taking remedial actions when the prioritization performance is not met.

In one embodiment a system for providing prioritized connectivity service based on geography using a HetNet Gateway (HNG), includes a HNG receiving a location and time where an event will take place; the HNG receiving a User Equipment (UE) prioritization to be used for the event; wherein the system generates a prioritization profile for the event; the system provides prioritization for the event based on the prioritization profile; and the system monitoring prioritization during the event and taking remedial actions when the prioritization performance is not met.

DETAILED DESCRIPTION

Figure 1:
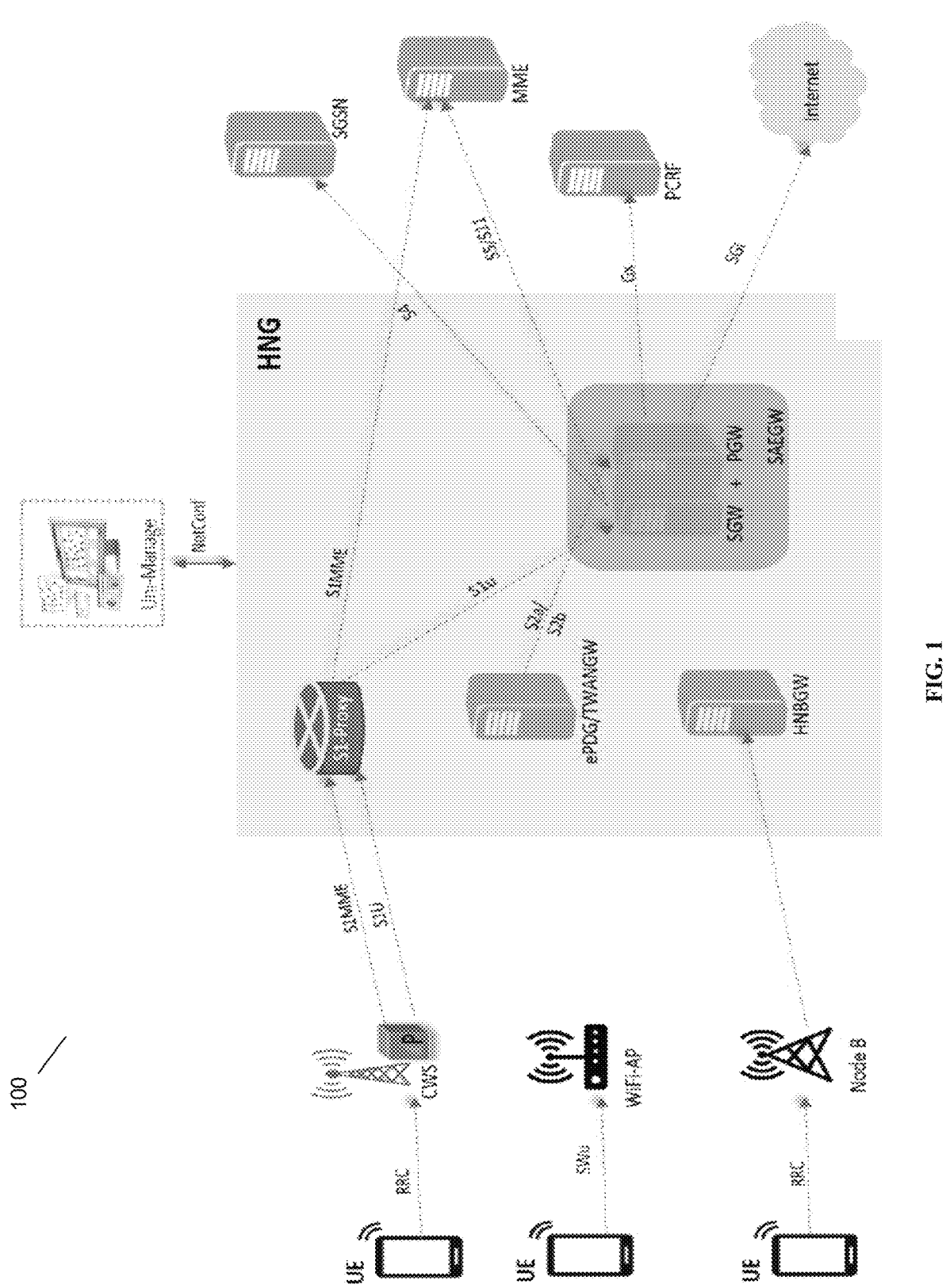
FIG. 1 is a system diagram showing an HNG environment, in accordance with some embodiments.

A standard HNG environment 100 is shown in FIG. 1. Current UE prioritization solutions need a list of IMSI's to support prioritization. However, such prioritization needs to be configured statically in HSS beforehand and there is no way to dynamically remove the prioritization without going through an explicit process.

Consider a geographic area which has gathering of people for certain occasion and the event organizer would like to ensure that users in that area get prioritized mobile data service for specified duration of time.

Provisioning of Prioritization
Request Made by Event Organizer

The event organizer specifies the geography where the event is going to take place using a tool such as Google Maps as shown below. Google Maps, GIS, or its equivalent is used to define a geographic area. The geographic area is converted using a process to identify specific coordinates in lat/long (latitude/longitude), for example, using a service such as the Google Maps Javascript API. The organizer may indicate the duration of the said event. The organizer may indicate periodicity of the event e.g. (a football match occurring every Sunday from 7 pm to 10 pm). The event organizer also specifies to mobile operator the class of UE prioritization using various tiers like gold, silver, bronze.

Figure 2:
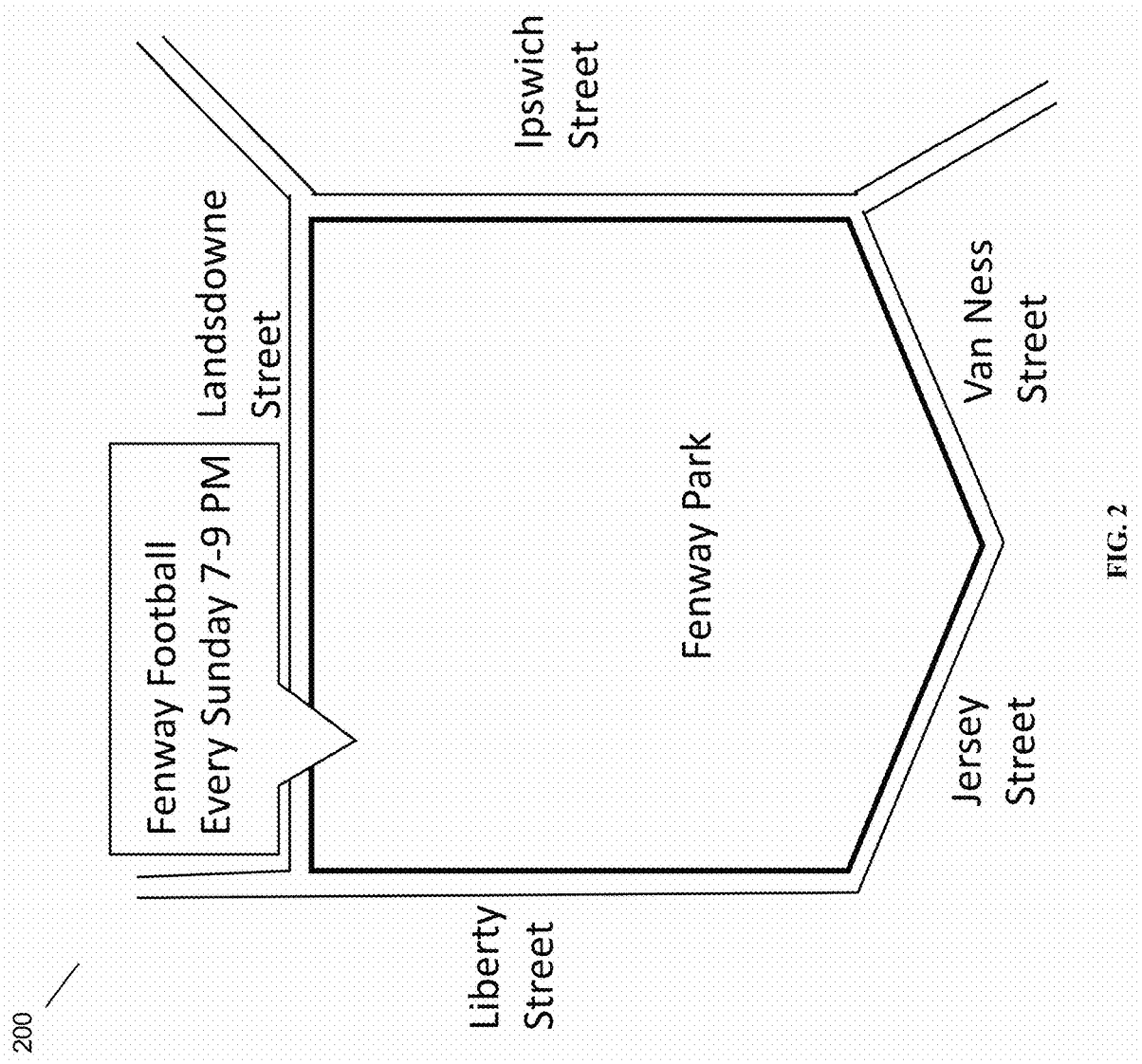
FIG. 2 is a high level map of the Fenway Park section of Boston.

An example event is shown in FIG. 2. Here a high level map of an area of Boston shows the Fenway Park area bordered by Landsdowne Street, Ipswich Street, Van Ness Street, Jersey Street and Liberty Street. An event for Fenway Football every Sunday from 7-9 p.m. is shown. An event organizer may submit the event to an automated system, which may ingest the event details and convert them to a geographic area defined by a set of coordinates (lat/long, etc.) or another typical way to identify a geographic area. The event details may then be made available to the network operator, for example, by being posted on a public site or via a private data exchange API.

Actions Taken by Operator

In some embodiments, the mobile operator may take the event details and determine an appropriate prioritization for certain users, identified users, or all users during the event. The prioritization context can be provisioned by the VRAN operator based on requests made by the event organizer. The mobile operator may map the requested service tier to various LTE QOS parameters like QCI, MBR, GBR and create a prioritization profile for same. The prioritization profile gets associated with prioritization context. For example, users at a VIP event may receive higher prioritization or zero-rated data for accessing certain data services, or, users at a high-capacity event may receive lower prioritization for purposes of minimizing event cost or for reducing load on the network.

In some embodiments, the mobile operator may maintain numerous such prioritization contexts for multiple event organizers for various locations and at different times. All the prioritization profiles created by operator are communicated to SON and identified by a unique profile id. Whenever a prioritization context needs to be activated across the network, the NMS signals a list of CWS's for prioritization, in some embodiments including the profile id associated with the required prioritization profile.

Metering of Prioritization

In some embodiments, an important thing to note is that the UE's don't get billed for the prioritized services they receive during the event, but the organizer of the event does. The operator may bill these event organizers on per event basis or on monthly/quarterly basis for periodic events. Different billing arrangements may be determined by the operator and with respect to the operator's agreement with a particular event organizer.

Conventional PCC & CGF, etc. architecture is used for providing policy-based service and charging to UE bearers, depending on the radio access network technology. This architecture is used for implementing default operator policy for said UE's.

However here we are using SON to initiate dedicated bearer with help of vSAEGW (or, as used herein, a virtualized gateway of an appropriate radio access technology). Hence SON is accountable for conveying usage information of prioritized services for each of the UE's in the geographic area. SON can query vSAEGW for accounting information once the event is over and the dedicated bearer is about to be torn down. Hence SON is in effect playing the role of PCC and CGF functionality for this specific use case.

The usage measured for the prioritized bearers across UE's is aggregated by SON and the generated CDR is uploaded to a charging server which is specified by operator. The CDR is characterized and identified by the event organizer ID and not by conventional UE identifiers like IMSI. Operator uses these CDR's to bill the event organizers.

Monitoring Prioritization and Taking Remedial Action

Once the prioritization context is active SON continually monitors QOS users are experiencing using KPI's obtained from the vSAEGW. If any deviation is detected from the expected performance numbers SON takes remedial actions as noted below.

| Performance bottleneck | Remedial Action |
|---|---|
| High packet loss and retransmissions on a per CWS basis | Push enhanced traffic prioritization profile to CWS in the said geography |
| Lower than expected data throughput | Provision higher priority dedicated bearer with better QCI |

Role of Solution Components

Various modules on HNG participate in implementing the idea in this patent. Below itemized list illustrates their role on the grand scheme of things.

Role of SON

Inside HNG, SON is an OAM module responsible for CWS cell configuration, KPI monitoring and stats collection. SON has global view of the coverage area of CWS cells.

When user specifies prioritization of UE's in certain geographic area this data is fed by NMS module to SON module using northbound (NB) API'S.

On receiving the geography information, SON can compose a list of all base stations e.g., Multi-Rat access devices) identified by RAN ID's which have coverage in the specified geographic area.

SON uses this list to dynamically configure traffic prioritization rules for these CWS's which provides prioritized treatment for all traffic originating & directed to such CWS's by using higher priority DSCP marking on CWS and HNG interconnect. The interconnect can be any suitable medium like 4G backhaul, satellite or microwave link.

5

Dedicated bearer provisioning by SON.

For connected UE's at start of prioritization duration.

Using RAN Id's list SON queries vENB module running on HNG for list of UE's (identified by IMSI) which are connected to CWS's in the specified list.

The list of UE's (identified by IMSI) is then sent to vSAEGW module by SON in 'prioritization start message'

For newly connecting UE's after start of prioritization duration.

When a UE connects to HNG it establishes at least one default bearer with vENB. After this vENB module forwards the UE connect event to SON module identifying the connected UE by IMSI and includes the CWS to which UE latched onto.

SON the queries its traffic prioritization profile database and checks if CWS prioritization is enabled for indicated RAN Id's at current time, where RAN id is any identifier that can identify a radio access network. In some embodiments, a RAN id is an identifier that is independent of radio access technology.

If prioritization is enabled SON sends incoming UE's IMSI to vSAEGW using 'prioritization start message'.

Role of CWS

CWS has IPsec connection with HNG to provide a secure communication channel for the IP packets flowing between CWS and HNG.

Upon receiving the traffic prioritization profile from HNG, CWS applies the specified traffic prioritization rules to all CWS originating traffic. IPsec data plane traffic header DSCP field is marked with DSCP values of inner IP packet.

Various classes of traffic originating from this CWS is prioritized by using higher priority DSCP marking as indicated in the dynamically provisioned traffic prioritization profile for the said time duration.

Role of HNG Datapath Module

HNG Datapath module should ensure that traffic coming from PDN directed to these CWS's should be prioritized using higher priority DSCP marking in the downlink direction.

Role of vENB

On receiving the CWS identifier list from SON, the virtualized access node (vENB) will compile list of all UE's connected to HNG through the specified CWS identifiers.

UE's establish at least one default bearer on a per APN basis. Hence vENB will have information of the UE's connected to the CWS's specified by SON. VENB identifies UE's using their IMSI.

Role of vSAEGW

On receiving list of IMSI's from SON module vSAEGW initiates flows for creation of high priority dedicated bearers for said UE's and supplies appropriate TFT's for the priority bearer.

SON will indicate to vSAEGW QCI, MBR, GBR to be used for the dedicated bearer and vSAEGW will provision dedicated bearer for UE based on that information.

When SON indicates that it's time to deactivate the previously created dedicated bearers for the specified UE's it will signal vSAEGW to tear down the bearers for the said IMSI list. On receiving this list vSAEGW will initiate NAS signaling towards specified UE's through MME to tear down the dedicated bearer.

The table following shows relation between QCI and bearer QOS parameters. QCI has a value range from 1 to 9. Each EPS bearer is defined with a QCI. The QCI determined how an IP packet on a bearer is processed in the user plane.

6

| QCI | Resource Type | Priority | Packet Delay Budget (ms) | Packet Error Loss Rate | Example service |
|---|---|---|---|---|---|
| 1 | GBR | 2 | 100 | $10^{-2}$ | Conversational voice |
| 2 | GBR | 4 | 150 | $10^{-3}$ | Conversational video |
| 3 | GBR | 3 | 50 | $10^{-3}$ | Realtime Gaming |
| 4 | GBR | 5 | 300 | $10^{-6}$ | Non-conversational voice |
| 5 | Non-GBR | 1 | 100 | $10^{-6}$ | IMS signaling |
| 6 | Non-GBR | 6 | 300 | $10^{-6}$ | TCP-based video |
| 7 | Non-GBR | 7 | 100 | $10^{-3}$ | Voice, video and interactive gaming |
| 8 | G Non-BR | 8 | 300 | $10^{-6}$ | TCP-based video |
| 9 | Non-GBR | 9 | 300 | $10^{-6}$ | TCP-based video |

Call Flow

Figure 3:
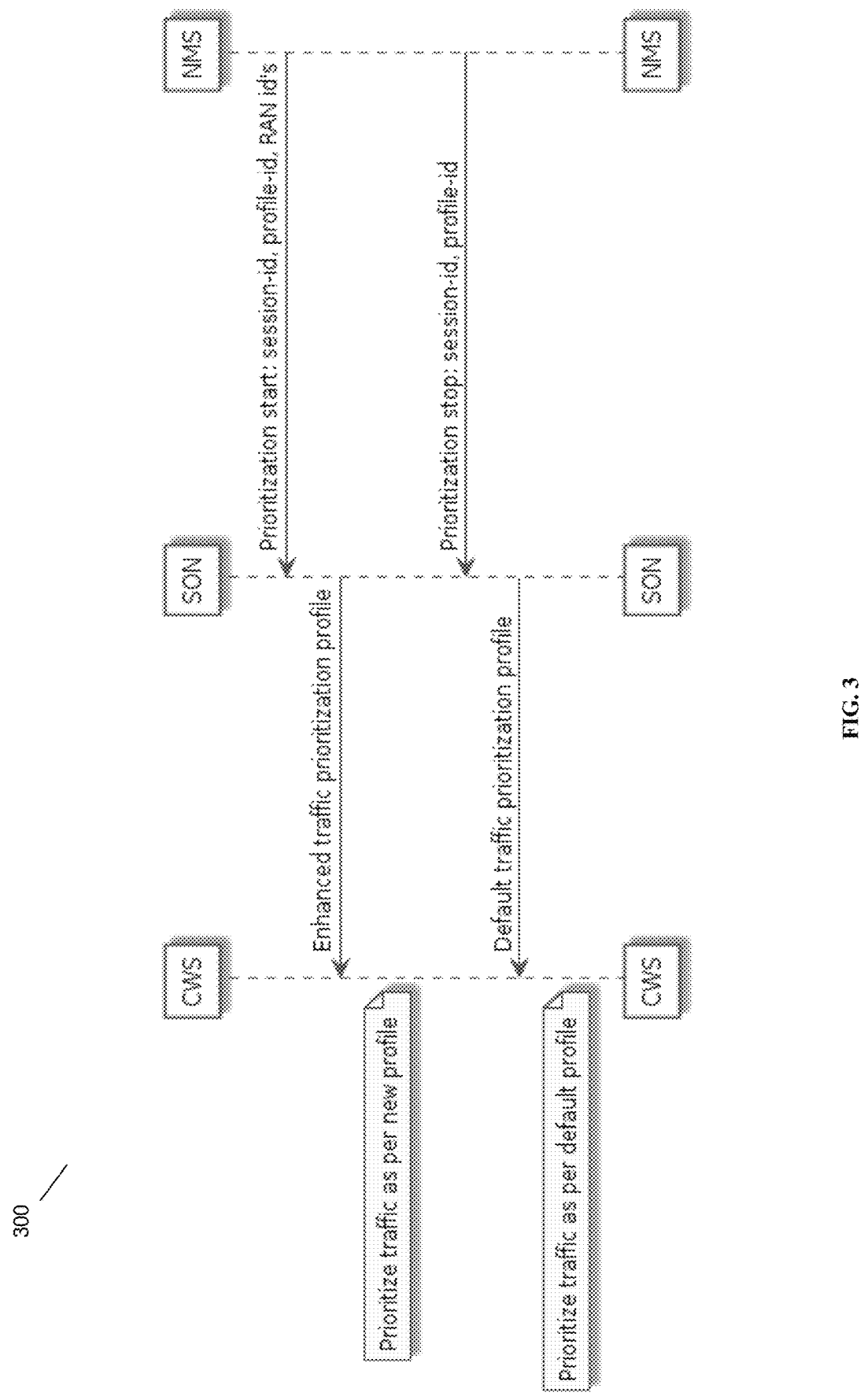
FIG. 3 is a message flow diagram of a traffic prioritization profile update, in accordance with some embodiments.

Traffic prioritization profile update 300 is shown in FIG. 3.

SON Triggered Network Initiated Dedicated Bearer

Below sequence diagram depicts various flows involved in prioritizing UE's.

Prioritizing UE's connected to HNG before start of event.

Figure 4:
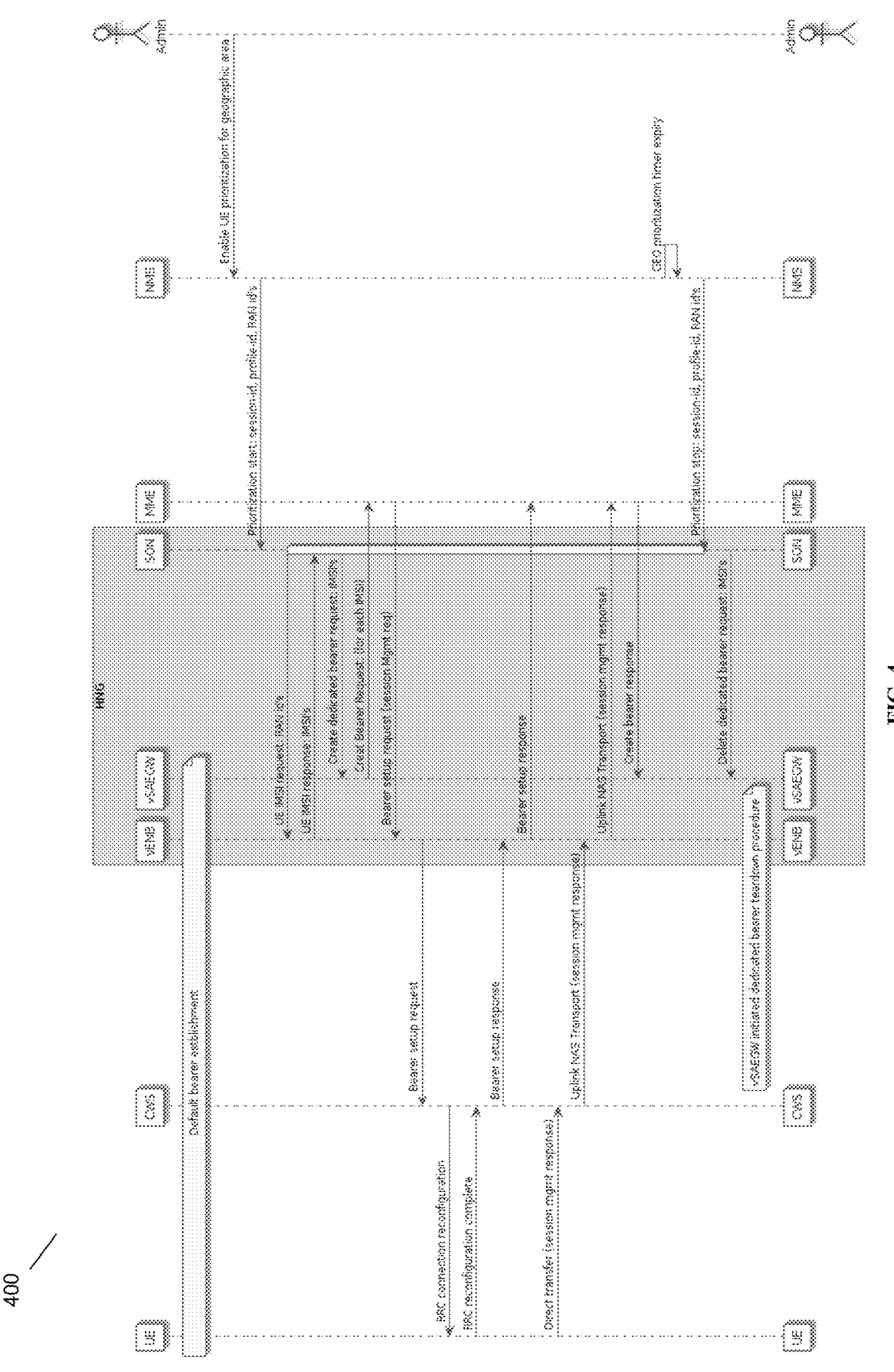
FIG. 4 is a is a message flow diagram of prioritization of UEs at a start of prioritization time, in accordance with some embodiments.

The sequence diagram 400 of FIG. 4 illustrates prioritization of UE's connected to specified CWS's in said geographic area at start of prioritization time.

Prioritizing UE's connecting to HNG after start of event.

Figure 5:
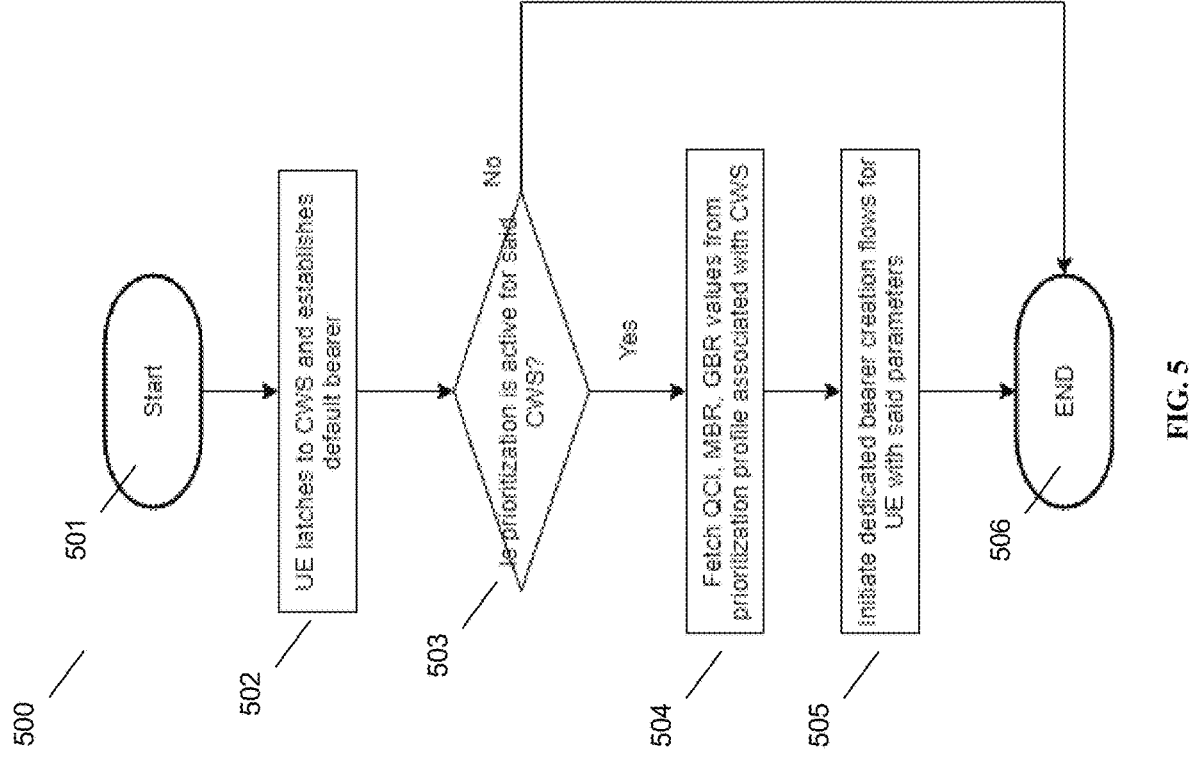
FIG. 5 is a flow diagram system diagram showing prioritization of UEs, in accordance with some embodiments.

FIG. 5 shows a flow diagram 500 for prioritization of UEs connecting CWS's in a geographic area. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Flow diagram 500 starts with block 501. At this block things such as counter initializations, flag resets, and related items are processed. Processing block 502 recites the UE latching to the CWS and establishing a default bearer. At decision block 503 a decision is made regarding whether prioritization is active for the CWS. When prioritization for the CWs is not active, the process ends at processing block 506. When the decision is that prioritization is active, processing block 504 is shows QCI, MBR and GBR values are fetched. At processing block 505 bearer creation flows are initiated for the UE with the parameters. The process ends at block 506.

Figure 6:
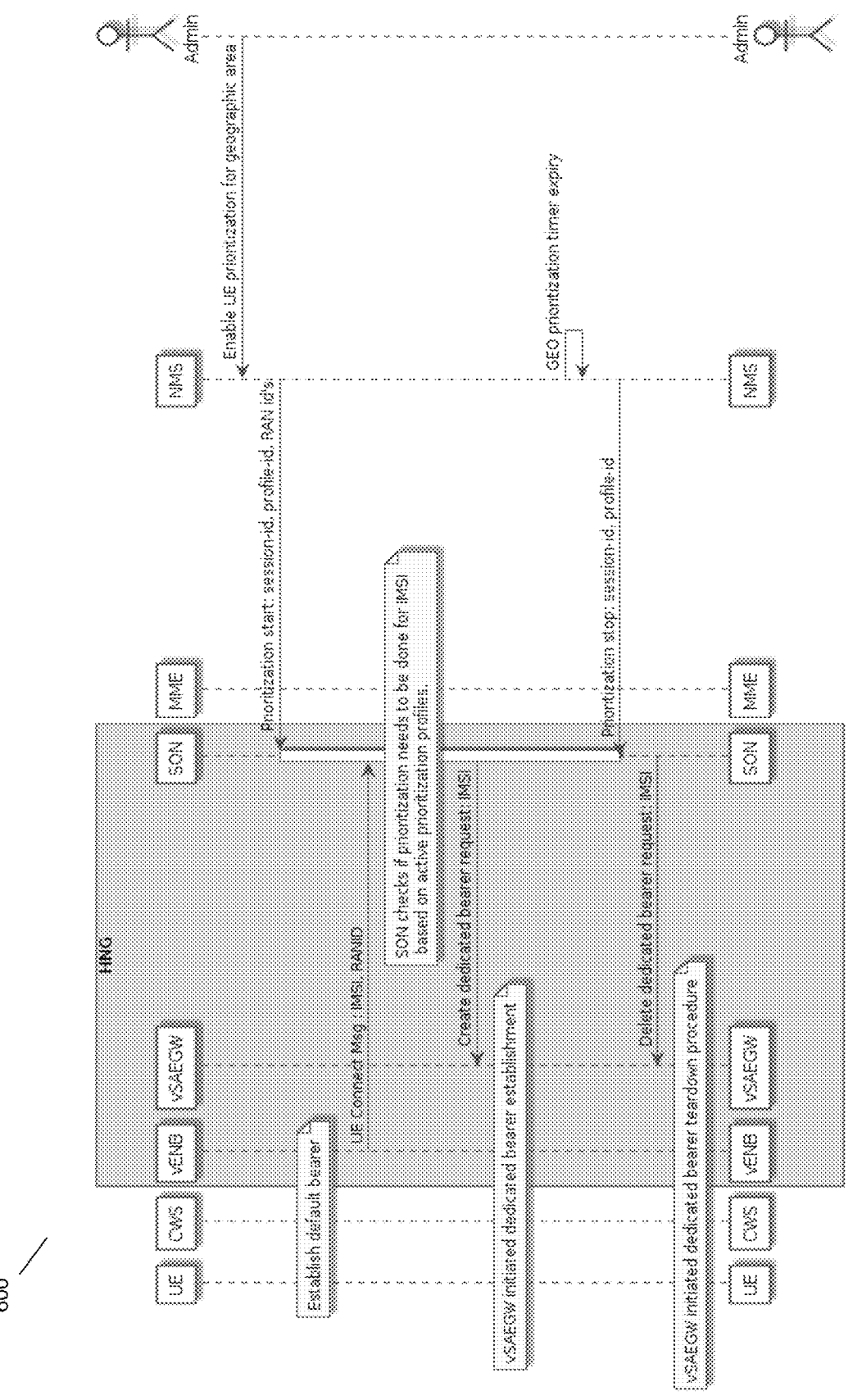
FIG. 6 is a message flow diagram of prioritization of UEs at a start of prioritization time, in accordance with some embodiments.

FIG. 6 shows a sequence diagram 600 prioritization of UE's connecting CWS's in said geographic area after start of prioritization time.

Figure 7:
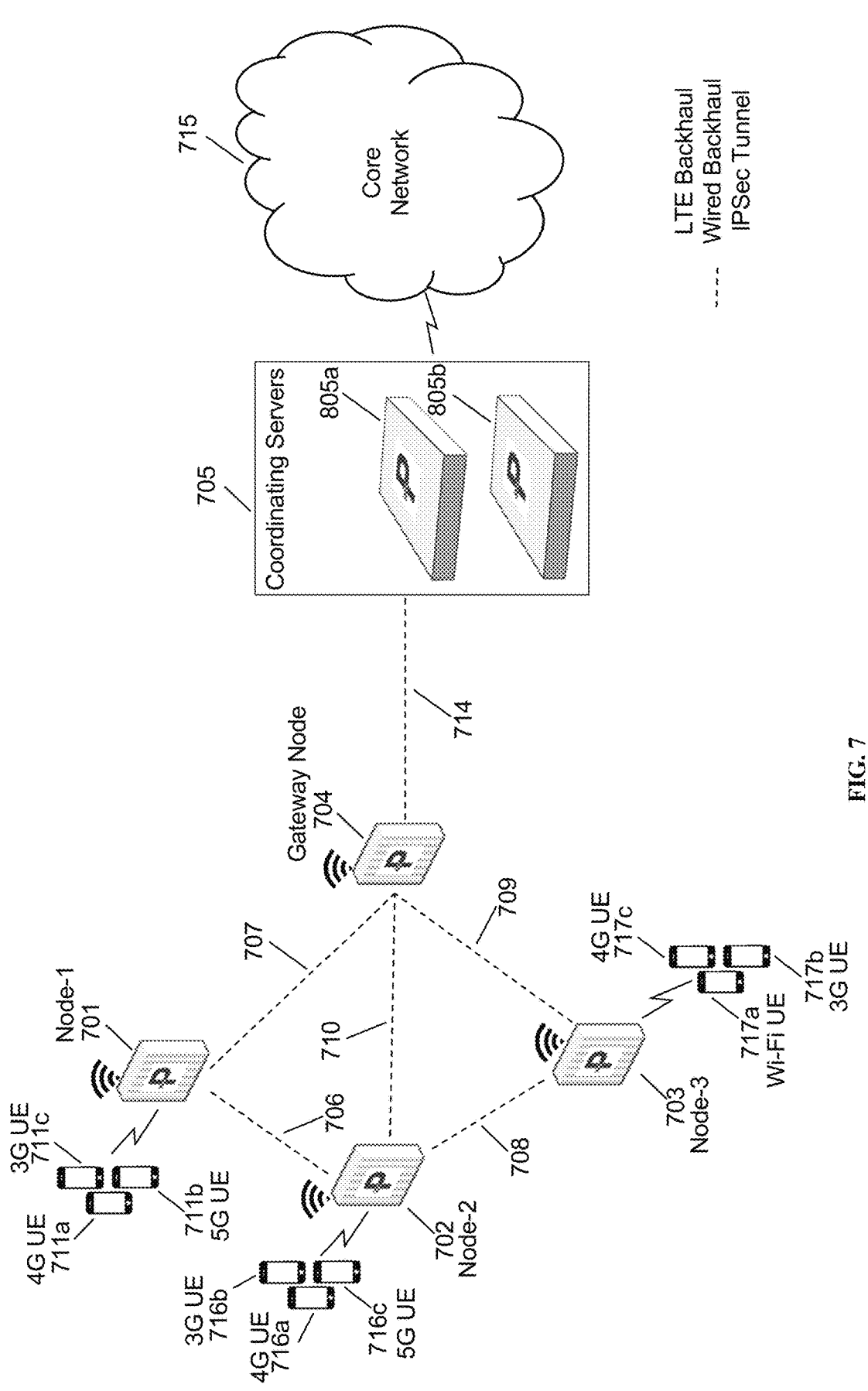
FIG. 7 is a schematic network architecture diagram for various radio access technology core networks.

FIG. 7 is a network diagram in accordance with some embodiments. In some embodiments, as shown in FIG. 7, a mesh node 1 801, a mesh node 2 702, and a mesh node 3 703 are any G RAN nodes. Base stations 101, 702, and 703 form a mesh network establishing mesh network links 706, 707, 708, 709, and 710 with a base station 704. The mesh network links are flexible and are used by the mesh nodes to route traffic around congestion within the mesh network as needed. The base station 704 acts as gateway node or mesh gateway node, and provides backhaul connectivity to a core network to the base stations 701, 702, and 703 over backhaul link 714 to a coordinating server(s) 705 and towards core network 715. The Base stations 701, 702, 703, 704 may also provide NodeB, NodeB, Wi-Fi Access Point, Femto Base Station etc. functionality, and may support radio access technologies such as 2G, 3G, 7G, 5G, Wi-Fi etc. The base stations 701, 702, 703 may also be known as mesh network nodes 701, 702, 703.

The coordinating servers 705 are shown as two coordinating servers 705a and 705b. The coordinating servers 705a and 705b may be in load-sharing mode or may be in active-standby mode for high availability. The coordinating servers 705 may be located between a radio access network (RAN) and the core network and may appear as core network to the base stations in a radio access network (RAN) and a single eNodeB to the core network, i.e., may provide virtualization of the base stations towards the core network. As shown in FIG. 7, various user equipments 711a, 711b, 711c are connected to the base station 701. The base station 701 provides backhaul connectivity to the user equipments 711a, 711b, and 711c connected to it over mesh network links 706, 707, 708, 709, 710 and 714. The user equipments may be mobile devices, mobile phones, personal digital assistant (PDA), tablet, laptop etc. The base station 702 provides backhaul connection to user equipments 712a, 712b, 712c and the base station 703 provides backhaul connection to user equipments 713a, 713b, and 713c. The user equipments 711a, 711b, 711c, 712a, 712b, 712c, 713a, 713b, 713c may support any radio access technology such as 2G, 3G, 7G, 5G, Wi-Fi, WiMAX, LTE, LTE-Advanced etc. supported by the mesh network base stations, and may interwork these technologies to IP.

In some embodiments, depending on the user activity occurring at the user equipments 711a, 711b, 711c, 712a, 712b, 712c, 713a, 713b, and 713c, the uplink 714 may get congested under certain circumstances. As described above, to continue the radio access network running and providing services to the user equipments, the solution requires prioritizing or classifying the traffic based at the base stations 701, 702, 703. The traffic from the base stations 701, 702, and 703 to the core network 715 through the coordinating server 705 flows through an IPSec tunnel terminated at the coordinating server 705. The mesh network nodes 701, 702, and 703 adds IP Option header field to the outermost IP Header (i.e., not to the pre-encapsulated packets). The traffic may from the base station 701 may follow any of the mesh network link path such as 707, 706-110, 706-108-109 to reach to the mesh gateway node 704, according to a mesh network routing protocol.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

Figure 8:
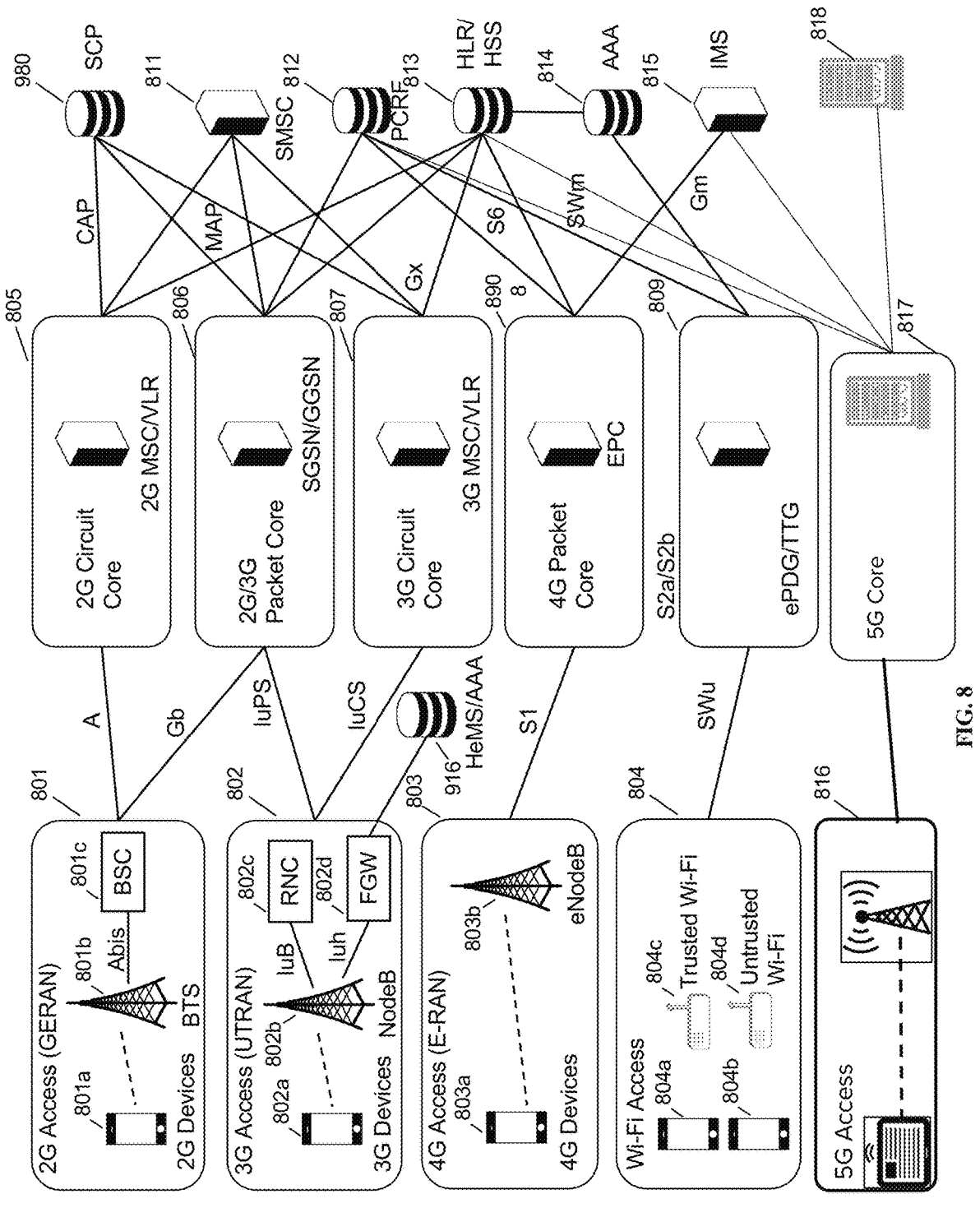
FIG. 8 is a schematic network architecture diagram for various radio access technology core networks

FIG. 8 is a schematic network architecture diagram for 3G and other-G prior art networks. The diagram shows a plurality of "Gs," including 2G, 3G, 4G, 5G and Wi-Fi. 2G is represented by GERAN 901, which includes a 2G device 801a, BTS 801b, and BSC 801c. 3G is represented by UTRAN 802, which includes a 3G UE 802a, nodeB 802b, RNC 802c, and femto gateway (FGW, which in 3GPP namespace is also known as a Home nodeB Gateway or HNBGW) 802d. 4G is represented by EUTRAN or E-RAN 803, which includes an LTE UE 803a and LTE eNodeB 803b. Wi-Fi is represented by Wi-Fi access network 804, which includes a trusted Wi-Fi access point 804c and an untrusted Wi-Fi access point 804d. The Wi-Fi devices 804a and 804b may access either AP 804c or 804d. In the current network architecture, each "G" has a core network. 2G circuit core network 805 includes a 2G MSC/VLR; 2G/3G packet core network 806 includes an SGSN/GGSN (for EDGE or UMTS packet traffic); 3G circuit core 807 includes a 3G MSC/VLR; 4G circuit core 808 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 830, the SMSC 831, PCRF 832, HLR/HSS 833, Authentication, Authorization, and Accounting server (AAA) 834, and IP Multimedia Subsystem (IMS) 835. An HeMS/AAA 836 is present in some cases for use by the 3G UTRAN. The diagram is used to indicate schematically the basic functions of each network as known to one of skill in the art, and is not intended to be exhaustive. For example, 8G core 817 is shown using a single interface to 8G access 816, although in some cases 8G access can be supported using dual connectivity or via a non-standalone deployment architecture.

Noteworthy is that the RANs 801, 802, 803, 804 and 836 rely on specialized core networks 805, 806, 807, 808, 809, 837 but share essential management databases 830, 831, 832, 833, 834, 835, 838. More specifically, for the 2G GERAN, a BSC 801c is required for Abis compatibility with BTS 801b, while for the 3G UTRAN, an RNC 802c is required for Iub compatibility and an FGW 802d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 9:
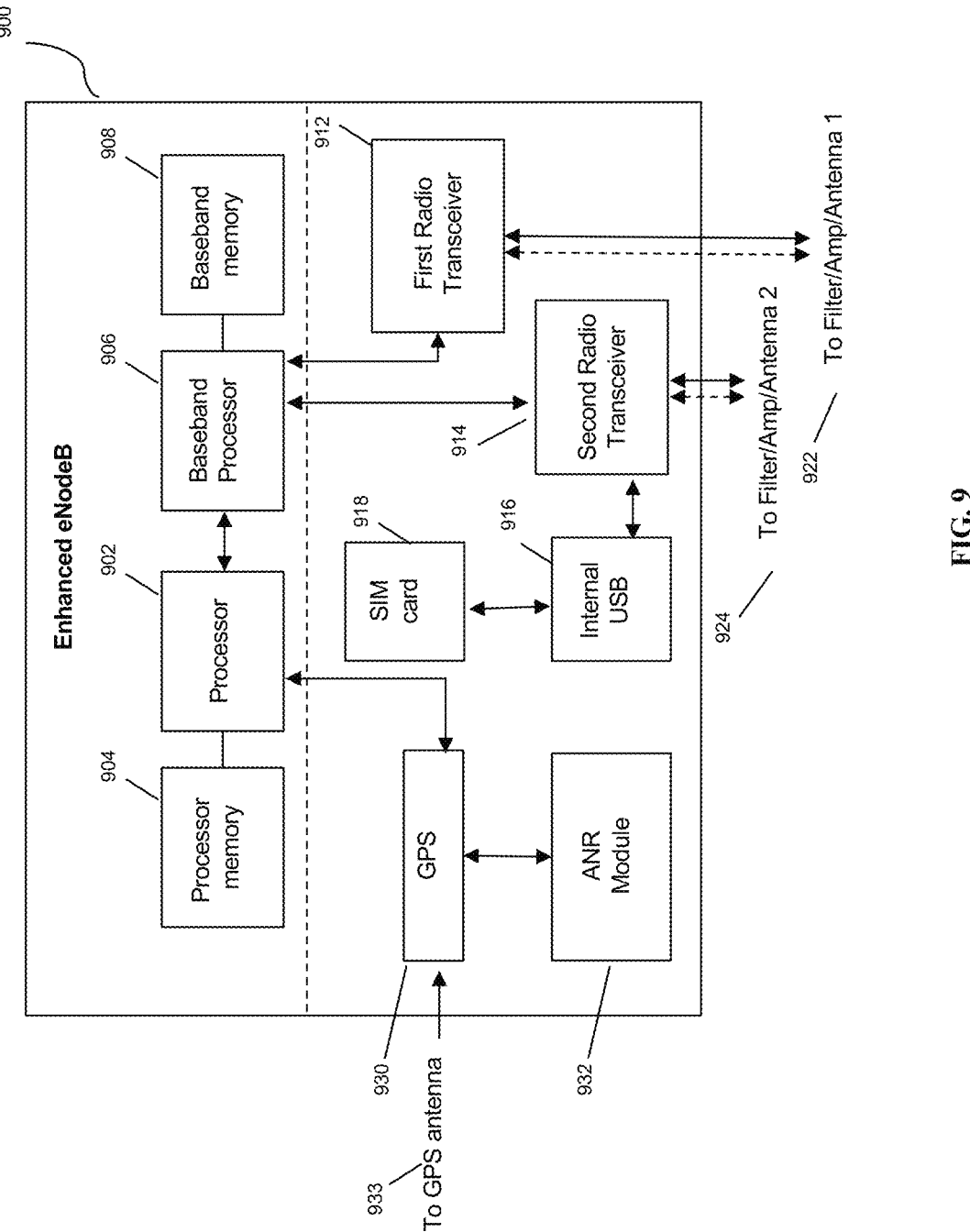
FIG. 9 is an enhanced eNodeB for performing the methods described herein, in accordance with some embodiments.

FIG. 9 is an enhanced eNodeB for performing the methods described herein, in accordance with some embodiments. Mesh network node 900 may include processor 902, processor memory 904 in communication with the processor, baseband processor 906, and baseband processor memory 908 in communication with the baseband processor. Mesh network node 900 may also include first radio transceiver 912 and second radio transceiver 914, internal universal serial bus (USB) port 916, and subscriber information module card (SIM card) 918 coupled to USB port 916. In some embodiments, the second radio transceiver 914 itself may be coupled to USB port 916, and communications from the baseband processor may be passed through USB port 916. The second radio transceiver may be used for wirelessly backhauling eNodeB 900.

Processor 902 and baseband processor 906 are in communication with one another. Processor 902 may perform routing functions, and may determine if/when a switch in network configuration is needed. Baseband processor 906 may generate and receive radio signals for both radio transceivers 912 and 914, based on instructions from processor 902. In some embodiments, processors 902 and 906 may be on the same physical logic board. In other embodiments, they may be on separate logic boards.

Processor 902 may identify the appropriate network configuration, and may perform routing of packets from one network interface to another accordingly. Processor 902 may use memory 904, in particular to store a routing table to be used for routing packets. Baseband processor 906 may perform operations to generate the radio frequency signals for transmission or retransmission by both transceivers 910 and 912. Baseband processor 906 may also perform operations to decode signals received by transceivers 912 and 914. Baseband processor 906 may use memory 908 to perform these tasks.

The first radio transceiver 912 may be a radio transceiver capable of providing LTE eNodeB functionality, and may be capable of higher power and multi-channel OFDMA. The second radio transceiver 914 may be a radio transceiver capable of providing LTE UE functionality. Both transceivers 912 and 914 may be capable of receiving and transmitting on one or more LTE bands. In some embodiments, either or both of transceivers 912 and 914 may be capable of providing both LTE eNodeB and LTE UE functionality. Transceiver 912 may be coupled to processor 902 via a Peripheral Component Interconnect-Express (PCI-E) bus, and/or via a daughtercard. As transceiver 914 is for providing LTE UE functionality, in effect emulating a user equipment, it may be connected via the same or different PCI-E bus, or by a USB bus, and may also be coupled to SIM card 918. First transceiver 912 may be coupled to first radio frequency (RF) chain (filter, amplifier, antenna) 922, and second transceiver 914 may be coupled to second RF chain (filter, amplifier, antenna) 924.

SIM card 918 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 900 is not an ordinary UE but instead is a special UE for providing backhaul to device 900.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 912 and 914, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 902 for reconfiguration.

A GPS module 930 may also be included, and may be in communication with a GPS antenna 932 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 932 may also be present and may run on processor 902 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 10:
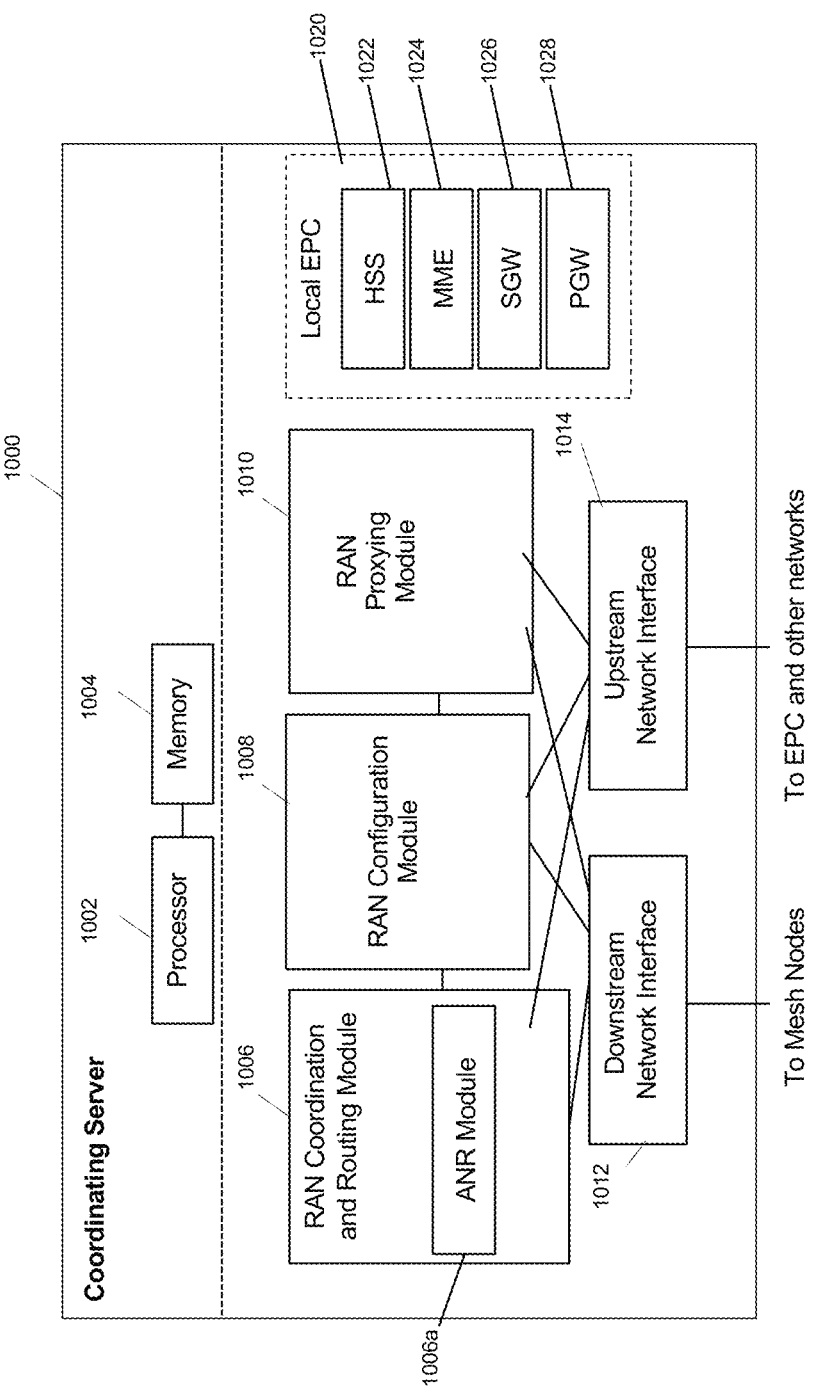
FIG. 10 is a coordinating server for providing services and performing methods as described herein, in accordance with some embodiments.

FIG. 10 is a coordinating server for providing services and performing methods as described herein, in accordance with some embodiments. Coordinating server 1000 includes processor 1002 and memory 1004, which are configured to provide the functions described herein. Also present are radio access network coordination/routing (RAN Coordination and routing) module 1006, including ANR module 1006a, RAN configuration module 1008, and RAN proxying module 1010. The ANR module 1006a may perform the ANR tracking, PCI disambiguation, ECGI requesting, and GPS coalescing and tracking as described herein, in coordination with RAN coordination module 1006 (e.g., for requesting ECGIs, etc.). In some embodiments, coordinating server 1000 may coordinate multiple RANs using coordination module 1006. In some embodiments, coordination server may also provide proxying, routing virtualization and RAN virtualization, via modules 1010 and 1008. In some embodiments, a downstream network interface 1012 is provided for interfacing with the RANs, which may be a radio interface (e.g., LTE), and an upstream network interface 1014 is provided for interfacing with the core network, which may be either a radio interface (e.g., LTE) or a wired interface (e.g., Ethernet).

Coordinator 1000 includes local evolved packet core (EPC) module 1020, for authenticating users, storing and caching priority profile information, and performing other EPC-dependent functions when no backhaul link is available. Local EPC 1020 may include local HSS 1022, local MME 1024, local SGW 1026, and local PGW 1028, as well as other modules. Local EPC 1020 may incorporate these modules as software modules, processes, or containers. Local EPC 1020 may alternatively incorporate these modules as a small number of monolithic software processes. Modules 1006, 1008, 1010 and local EPC 1020 may each run on processor 1002 or on another processor, or may be located within another device.

In some embodiments the system may include a HetNet Gateway (HNG), and may also include a multi-RAT network and a multi-RAT core.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing prioritized connectivity service based on geography, the method comprising:

identifying, at a Self-Organizing Network (SON) server, a location and time where an event will take place;

identifying, at the Self-Organizing Network (SON) server, a User Equipment (UE) prioritization to be used for the event;

generating a prioritization profile for the event;

providing prioritization for the event based on the prioritization profile;

pushing the prioritization profile to a radio access network (RAN) network node;

receiving, at the SON server, a connect event of the UE, the UE's IMSI, and a RAN ID;

determining, at the SON server, whether the traffic prioritization profile is enabled for the RAN ID at current time;

upon determining that prioritization is enabled, the SON server, sending a prioritization start message and the UE IMSI;

monitoring prioritization during the event and taking remedial actions upon determining the prioritization performance is not met;

querying, by the SON server, for accounting information once the event is over; and conveying information of usage, by at least the UE, of the prioritized connectivity service based on geography.

2. The method of claim 1 further comprising specifying a duration for the event.

3. The method of claim 1 further comprising specifying a periodicity for the event.

4. The method of claim 1 further comprising specifying a class of UE prioritization for the event.

5. The method of claim 1 wherein monitoring prioritization during the event comprises monitoring a Quality of Service (QoS) of at least one user.

6. The method of claim 1, wherein taking remedial actions comprises pushing an enhanced traffic prioritization profile to the RAN network node when the user experiences at least one of high packet loss and retransmissions on a per CWS per-RAN basis.

7. The method of claim 1 wherein taking remedial actions comprises provisioning higher priority dedicated bearer with improved Quality of Service (QoS) Class Indicator (QCI) when the user experiences lower than expected data throughput.

8. A non-transitory computer-readable medium containing instructions for core prioritized connectivity service based on geography which, when executed, causes a system node to perform steps comprising:

identifying, at the system node, a location and time where an event will take place;

identifying, at the system node, a User Equipment (UE) prioritization to be used for the event;

generating a prioritization profile for the event;

providing prioritization for the event based on the prioritization profile;

pushing the prioritization profile from the system node to a radio access network (RAN) network node;

receiving, at the system node, a connect event of the UE, the UE's IMSI, and a RAN ID;

determining, at the system node, whether the traffic prioritization profile is enabled for the RAN ID at current time;

upon determining that prioritization is enabled, the system node, sending a prioritization start message and the UE IMSI;

monitoring prioritization during the event and taking remedial actions upon determining the prioritization performance is not met;

querying, by the system node, for accounting information once the event is over; and conveying information of usage, by at least the UE, of the core prioritized connectivity service based on geography.

9. The non-transitory computer-readable medium of claim 8 further comprising instructions specifying a duration for the event.

10. The non-transitory computer-readable medium of claim 8 further comprising instructions specifying a periodicity for the event.

11. The non-transitory computer-readable medium of claim 8 further comprising instructions specifying a class of UE prioritization for the event.

12. The non-transitory computer-readable medium of claim 8 further comprising instructions wherein monitoring prioritization during the event comprises monitoring a Quality of Service (QoS) of at least one user.

13. The non-transitory computer-readable medium of claim 8 further comprising instructions wherein taking remedial actions comprises pushing an enhanced traffic prioritization profile to the RAN node when the user experiences at least one of high packet loss and retransmissions on a per-RAN basis.

14. The non-transitory computer-readable medium of claim 8 further comprising instructions wherein taking remedial actions comprises provisioning higher priority dedicated bearer with improved Quality of Service (QoS) Class Indicator (QCI) when the user experiences lower than expected data throughput.

15. A system for providing prioritized connectivity service based on geography using a Self-Organizing Network (SON) server, the system comprising:

a SON server;

and a network device;

the SON server configured to receive a location and time where an event will take place and for receiving a User Equipment (UE) prioritization to be used for the event;

the network device configured to generate a prioritization profile for the event;

the SON server configured to provide prioritization for the event based on the prioritization profile;

the SON server configured to receiving a connect event of the UE, the UE's IMSI, and a RAN ID;

the SON server configured to determine whether the traffic prioritization profile is enabled for the RAN ID at current time;

the SON server configured to determine that prioritization is enabled and send a prioritization start message and the UE IMSI;

the SON server configured to monitor prioritization during the event and taking remedial actions when the prioritization performance is not met;

the SON server configured to query for accounting information once the event is over; and the SON server configured to convey information of usage, by at least the UE, of the prioritized connectivity service based on geography.

16. The system of claim 15 wherein a duration for the event is received.

17. The system of claim 15 wherein a periodicity for the event is received.

18. The system of claim 15 wherein a class of UE prioritization for the event is received.

19. The system of claim 15 wherein monitoring prioritization the event comprises monitoring a Quality of Service (QoS) of at least one user.

20. The system of claim 15 wherein taking remedial actions comprises pushing an enhanced traffic prioritization profile to a radio access network (RAN) node when the user experiences at least one of high packet loss and retransmissions on a per-RAN basis and wherein taking remedial actions comprises provisioning higher priority dedicated bearer with improved Quality of Service (QoS) Class Indicator (QCI) when the user experiences lower than expected data throughput.

\* \* \* \* \*